(12) United States Patent
Hamid et al.

(10) Patent No.: US 9,454,387 B2
(45) Date of Patent: *Sep. 27, 2016

(54) METHOD AND SYSTEM FOR INSTALLING PORTABLE EXECUTABLE APPLICATIONS

(75) Inventors: Laurence Hamid, Ottawa (CA); Marc Charbonneau, Casselman (CA)

(73) Assignee: Kingston Digital, Inc., Fountain Valley, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 13/607,053

(22) Filed: Sep. 7, 2012

(65) Prior Publication Data

US 2013/0067457 A1 Mar. 14, 2013

Related U.S. Application Data

(63) Continuation of application No. 11/347,259, filed on Feb. 6, 2006, now Pat. No. 8,286,158.

(51) Int. Cl.
*G06F 9/445* (2006.01)
*G06F 9/44* (2006.01)

(52) U.S. Cl.
CPC .................. *G06F 9/44584* (2013.01)

(58) Field of Classification Search
USPC ........................................................ 717/175
See application file for complete search history.

(56) References Cited

U.S. PATENT DOCUMENTS

| | | |
|---|---|---|
| 4,724,521 A | 2/1988 | Carron et al. |
| 5,367,686 A | 11/1994 | Fisher et al. |
| 5,481,714 A | 1/1996 | Pipkin et al. |
| 5,586,323 A | 12/1996 | Koizumi et al. |
| 5,666,533 A | 9/1997 | Horiguchi et al. |
| 5,715,463 A | 2/1998 | Merkin |
| 6,096,096 A | 8/2000 | Murphy et al. |
| 6,226,747 B1 | 5/2001 | Larsson et al. |
| 6,253,258 B1 | 6/2001 | Cohen |
| 6,272,674 B1 | 8/2001 | Holiday, Jr. |
| 6,289,397 B1 | 9/2001 | Tsuyuguchi et al. |
| 6,360,364 B1 * | 3/2002 | Chen .................. G06F 8/61 711/169 |
| 6,480,867 B1 | 11/2002 | Kwan |
| 6,615,405 B1 | 9/2003 | Goldman et al. |
| 6,658,571 B1 | 12/2003 | O'Brien et al. |

(Continued)

OTHER PUBLICATIONS

Franz, Michael Steffen Oliver. "Code-Generation On-the-Fly: A Key to Portable Software," Swiss Federal Institute of Technology Zurich, 1994, p. 1-54. Retrieved from the Internet: <URL: http://moldovacc.md/acoulichev/th10497.pdf>.

(Continued)

*Primary Examiner* — Marina Lee
(74) *Attorney, Agent, or Firm* — Dorsey & Whitney LLP

(57) ABSTRACT

According to the invention, a first executable environment is provided. The first executable environment is for execution within an operating system environment of a host computer system. The first executable environment is not an emulator for emulating any of another processor and another operating system. A software application is provided for installation and execution within the operating system environment. The software application is for fixed installation and not for installation in a portable fashion for being ported from one host computer system to another. The software application is then installed within the first executable environment, the installed software application installed within a removable peripheral memory storage device for execution within the first executable environment.

29 Claims, 6 Drawing Sheets

(56) References Cited

U.S. PATENT DOCUMENTS

| | | | |
|---|---|---|---|
| 6,763,518 B2 | 7/2004 | Hart et al. | |
| 6,983,460 B1 | 1/2006 | Goire et al. | |
| 7,069,442 B2 | 6/2006 | Sutton et al. | |
| 7,398,532 B1 | 7/2008 | Barber et al. | |
| 7,571,346 B2 * | 8/2009 | Illowsky et al. | 714/10 |
| 7,673,308 B2 * | 3/2010 | McMillan | G06F 9/45537 717/127 |
| 8,286,158 B2 * | 10/2012 | Hamid | G06F 9/44584 717/174 |
| 8,516,471 B2 * | 8/2013 | Bhakta | G06F 8/65 717/168 |
| 2002/0065945 A1 | 5/2002 | Calder et al. | |
| 2002/0083183 A1 | 6/2002 | Pujare et al. | |
| 2002/0092003 A1 | 7/2002 | Calder et al. | |
| 2002/0100037 A1 | 7/2002 | Kitagawa | |
| 2002/0107907 A1 | 8/2002 | Case et al. | |
| 2002/0138545 A1 * | 9/2002 | Andreakis et al. | 709/200 |
| 2002/0188938 A1 | 12/2002 | Dong et al. | |
| 2003/0174167 A1 | 9/2003 | Poo et al. | |
| 2003/0188165 A1 | 10/2003 | Sutton et al. | |
| 2004/0001088 A1 | 1/2004 | Stancil et al. | |
| 2004/0148600 A1 | 7/2004 | Hoshino | |
| 2005/0015761 A1 | 1/2005 | Chang et al. | |
| 2005/0076326 A1 | 4/2005 | McMillan et al. | |
| 2005/0114643 A1 | 5/2005 | Bryant-Rich et al. | |
| 2005/0114870 A1 | 5/2005 | Song et al. | |
| 2005/0166201 A1 | 7/2005 | Lai | |
| 2005/0193389 A1 | 9/2005 | Murphy et al. | |
| 2005/0198485 A1 | 9/2005 | Nguyen et al. | |
| 2005/0240921 A1 | 10/2005 | Barker et al. | |
| 2005/0289508 A1 * | 12/2005 | Illowsky et al. | 717/106 |
| 2006/0015665 A1 * | 1/2006 | Illowsky et al. | 710/100 |
| 2006/0026414 A1 | 2/2006 | Firebaugh et al. | |
| 2006/0048136 A1 * | 3/2006 | Vries | G06F 8/60 717/174 |
| 2006/0130004 A1 | 6/2006 | Hughes et al. | |
| 2006/0218549 A1 | 9/2006 | Hsu et al. | |
| 2007/0168937 A1 | 7/2007 | Mallick | |
| 2007/0234344 A1 * | 10/2007 | Hamid | G06F 9/44584 717/174 |
| 2008/0010630 A1 | 1/2008 | Ou-Yang et al. | |
| 2009/0111453 A1 * | 4/2009 | Hsu et al. | 455/419 |
| 2011/0083126 A1 * | 4/2011 | Bhakta | G06F 8/65 717/168 |
| 2013/0067457 A1 * | 3/2013 | Hamid | G06F 9/44584 717/174 |

OTHER PUBLICATIONS

Favre, Jean-Marie. "A Rigorous Approach to Support the Maintenance of Large Portable Software," IEEE, 1997, pp. 44-47. Retrieved from the Internet: <URL: http://ieeexplore.ieee.org/stamp/stamp.jsp?tp=&arnumber=583003>.

Brown, P.J. "Levels of Language for Portable Software," ACM, 1974, pp. 1059-1062. Retrieved from the Internet: <URL: http://delivery.acm.org/10.1145/370000/361624/p1059-brown.pdf>.

Garfinkel, T. et al. "Virtual Machine Monitors: Current Technology and Future Trends," Computer, IEEE Service Center, Los Alamitos, CA, US, vol. 38, No. 5, May 1, 2005, pp. 39-47, ISSN: 0018-9162.

Bellard, Fabrice. "QEMU, a Fast and Portable Dynamic Translator", USENIX Annual Technical Conference 2005, p. 41-46, Feb. 5, 2010. Retrieved from the Internet: <URL: http://www.usenix.org/event/usenix05/tech/freenix/full_papers/bellard/bellard.pdf>.

Bloch, Matthew. "Dropping Windows with WineLib", Jan. 1, 2003. Retrieved from the Internet: <URL:http://www.drdobbs.com/cpp/184401635> on Feb. 5, 2010.

Makofsky, Steve. "Portable CE", Dec. 20, 2004, The Furrygoat Experience, p. 1-9. Retrieved from the Internet: <URL: http://www.furrygoat.com/2004/12/20/portable-ce/>.

Wikipedia, "Installation (computer programs)", Feb. 24, 2011, Wikipedia, the Free Encyclopedia, pp. 1-5. Retrieved from the Internet: <URL: http://en.wikipedia.org/wiki/installation_(computer_programs)>.

U.S. Appl. No. 60/739,835.

* cited by examiner

METHOD AND SYSTEM FOR INSTALLING PORTABLE EXECUTABLE APPLICATIONS

CROSS-REFERENCE TO RELATED APPLICATIONS

This application is a continuation of U.S. patent application Ser. No. 11/347,259, filed Feb. 6, 2006, entitled "Method And System For Installing Portable Executable Applications," now issued as U.S. Pat. No. 8,286,158, which is hereby incorporated by reference in its entirety.

FIELD OF THE INVENTION

The invention relates generally to portable memory storage devices and more particularly to a method and system for installing applications within portable memory storage devices.

BACKGROUND OF THE INVENTION

As computer processing power has increased, the complexity of operating systems has increased. With increasing operating system complexity, installation of devices within the operating system and installation of applications requires more dynamic linked library (DLL) files and other system level files associated with an application.

Unfortunately, whereas the Apple II Plus® allowed for portability of an application without installation thereof between many different computers simply by porting the floppy disk on which the application instruction data was stored between the different computers, today's computer systems limit portability of applications due to the complex installation process and the system level files thereby installed.

Limited portability of applications also acts to support common application installations within an environment. Thus, within a same business, typically each employee has a computer system that is commonly configured with same software applications to support common data file formats and portability of data files. Further, removable peripheral memory storage devices such as USB memory keys are commonly used to port data between computer systems.

Unfortunately, some software applications do not readily lend themselves to widespread installation—either due to cost or to limited requirements for their use. Further, with the size and portability of USB memory keys, porting of data to locations outside of the business environment often occurs where common applications may or may not be available.

One solution to this problem is to provide user data that is self executing. This is common in self extracting compressed files wherein the extraction data is stored within the data file including the compressed data. Self extracting files, due to their limited system calls—memory access and storage access—are easily implemented in a system independent fashion. Conversely, a word processor with its complex system calls is not well suited to being implemented in a system independent fashion nor is it compact allowing for easy portability with each word processor data file.

It would be advantageous to provide a method of porting software applications that supports more complex software applications and allows for execution of those applications within different host computer environments without requiring the software application to be installed within each host computer environment

SUMMARY OF THE INVENTION

In accordance with the invention there is provided a method comprising: providing a first executable environment, the first executable environment for execution within an operating system environment of a host computer system, the first executable environment for other than emulating any of another processor and another operating system; providing a software application for installation and execution within the operating system environment, the software application other than for installation in a portable fashion for being ported from one host computer system to another; and, installing the software application within the first executable environment, the installed software application installed within a removable peripheral memory storage device for execution within the first executable environment.

In accordance with another aspect of the invention there is provided a removable peripheral memory storage device comprising: non-volatile random access memory; and software application data stored within the non-volatile random access memory, the software application data for when executed within a first executable environment resulting in execution of the software application, the first executable environment other than a host system operating system, an operating system emulator for an operating system other that the host system operating system, and a processor emulator for a processor other than the host system processor, wherein the software application once installed within the removable peripheral memory storage device is executable within any of a plurality of host computer systems each supporting the first executable environment absent installation of system level files, and data of the software application within each of the plurality of host computer systems.

In accordance with the invention there is provided a method comprising: providing a first executable environment, the first executable environment for execution within a first operating system environment of a host computer system, the first executable environment for other than emulating any of another processor and another operating system; providing a second executable environment, the second executable environment for execution within a second operating system environment of a second other host computer system, the second executable environment for other than emulating any of another processor and another operating system; and providing a software application for installation and execution within the first operating system environment and the second operating system environment, the software application other than for installation in a portable fashion for being ported from one host computer system to another; and, installing the software application within the first executable environment, the installed software application installed within a storage device for execution within each of the first executable environment and the second executable environment and accessible to each of the host computer system and the second other host computer system.

Advantageously, some embodiments of the invention allow for use of hardware specific features of a device absent installation of device drivers. This is particularly beneficial when permission to modify the host computer environment is unavailable.

BRIEF DESCRIPTION OF THE DRAWINGS

The invention will now be described with reference to particular embodiments details of which are shown in the attached drawings where.

DETAILED DESCRIPTION OF EMBODIMENTS OF THE INVENTION

In the description set out herein below, the term portable storage medium refers to portable storage media such as USB storage media, portable hard drives, PCMCIA memory devices, DVDROMs, CDROMs, and portable magnetic storage media. Further, the method applies to software installed within network drives, the software developed for other than portable installation.

Figure 1:
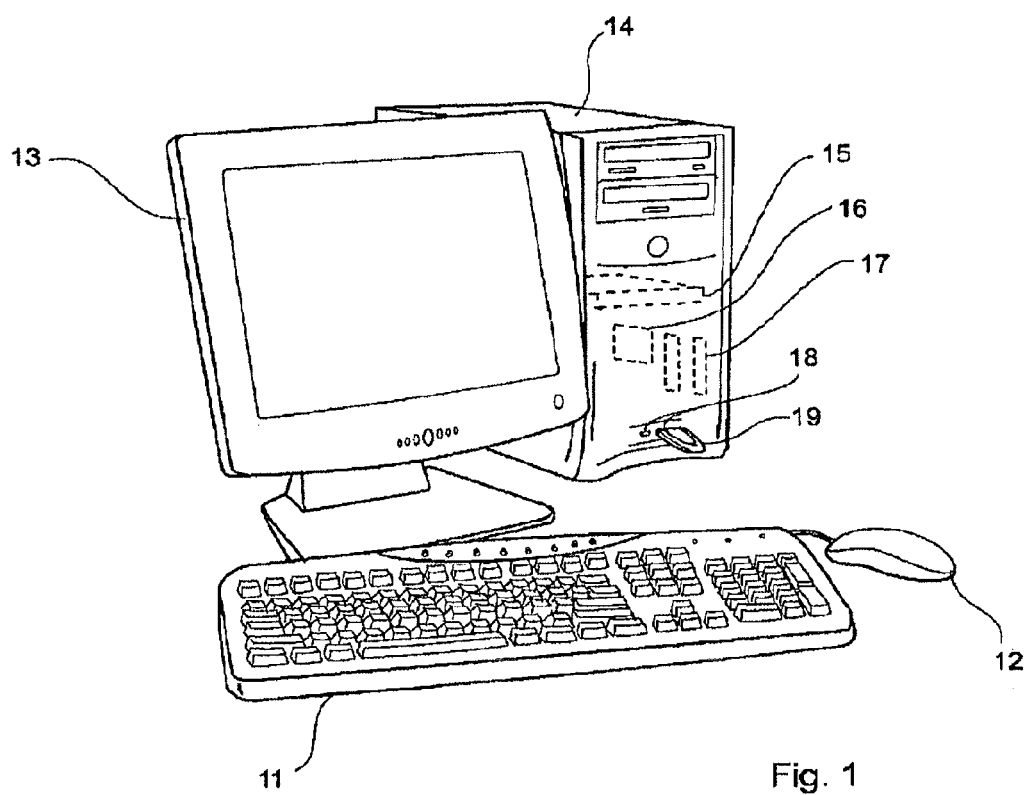
FIG. 1 shows a simplified schematic diagram illustrating a computer system for use with the herein described embodiments of the present invention.

Referring to FIG. 1, shown is a simplified schematic diagram of a computer system including a keyboard 11, a mouse 12, a monitor 13, a computer 14 including internal hard drive 15; processor 16, and memory 17, and an interface port 18 in the form of a USB port. Coupled to the interface port 18 is a removable peripheral memory storage device 19 in the form of a USB memory storage device sometimes referred to as a USB memory key.

Figure 2A:
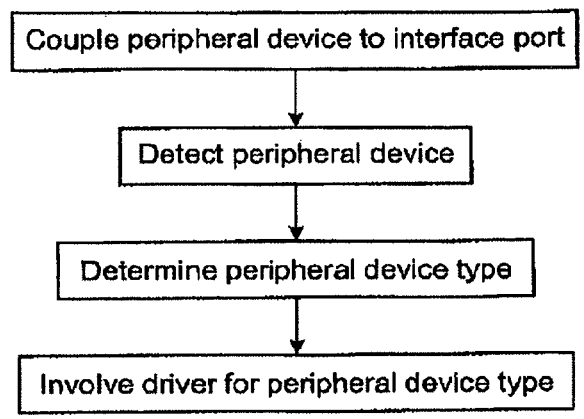
FIG. 2a is a simplified flow diagram of a method of employing a removable storage medium for installing software within a host computer system.

Referring to FIG. 2a, shown is a simplified flow diagram of a method of using the removable peripheral memory storage device 19. The removable peripheral memory storage device 19 is coupled with the interface port 18. Upon coupling therewith, the removable peripheral memory storage device 19 is detected by the processor 16, which interrogates the removable peripheral memory storage device 19 to determine what device it is. When it is determined that the removable peripheral memory storage device 19 is a USB key, a standard USB key driver is invoked for managing the removable peripheral memory storage device 19 coupled to the interface port 18. Thus, data stored within the removable peripheral memory storage device 19 is accessible to processes in execution by the processor 16. Further, data from within the removable peripheral memory storage device 19 is available for copying to the memory 17 and data within the memory 17 is available for copying to the removable peripheral memory storage device 19. Also of note, applications that are typically stored within portable devices such as CD-ROMS and DVD-ROMS are executable directly from the removable peripheral memory storage device 19.

Figure 2B:
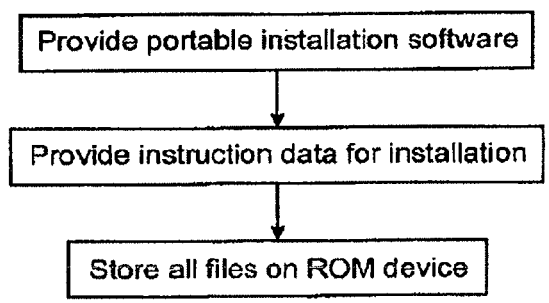
FIG. 2b is a simplified flow diagram of a method of employing a removable storage medium such as a DVD ROM for installing software within a host computer system.

Referring to FIG. 2b, shown is a simplified flow diagram of a method of installing software within a portable storage medium in the form of a CD-ROM or a DVD-ROM according to the prior art. An install software application is provided for use in installing of application software onto an internal hard drive. The install software includes several modules including a licensing module for ensuring that each user is apprised of the software license for installed software; an interrogation module for determining operating system and hardware configuration of a computer system on which to install the software; a file copying module for copying files necessary for the installation to the internal hard drive; an installation module for installing the software application on the computer system; and a clean up module for finishing the installation and deleting any unnecessary files copied during and for the installation process.

As is evident to those of skill in the art, the interrogation module allows the software to operate on a variety of systems having a same or similar operating system. Further, the design of the installation software application is such that it does not rely on configuration specific features in order to operate, and as such, is generic to different hardware and software configurations—typically a subset of operating system versions from a same operating system vendor. That said, the installed software optionally varies for different hardware and software configurations. This is achieved by providing different install versions depending on the hardware and software configuration. Of note, in order to support these different configurations, extra install data is stored within the storage medium from which the installation occurs.

Figure 3:
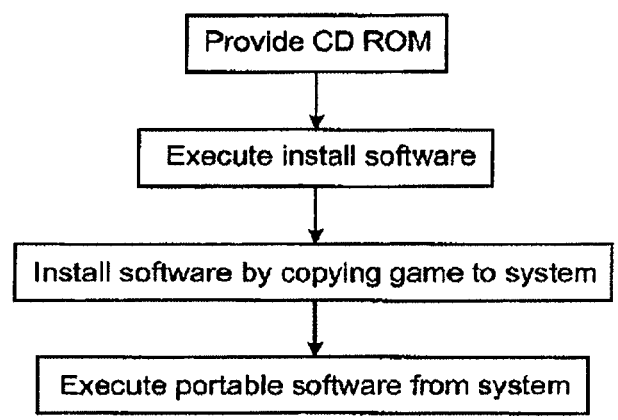
FIG. 3 is a simplified flow diagram of a method of installing a software application specifically designed for installation within a portable storage medium and for porting between different computer systems.

Referring to FIG. 3, shown is a simplified flow diagram of a method of installing software within a portable storage medium according to the prior art. A first software application is provided on a read only storage medium for installation onto a portable RAM storage medium. The application is specifically designed for installation in portable storage media. The software application is developed specifically for computer system independent installation. The software application includes processes for interfacing with different computers either using only standard drivers and libraries of the different computers. Thus, the software application has limited efficiency and functionality as it is incapable of optimizing performance or using advanced features based on selection of routines and services from available hardware and libraries. Alternatively, computer system independence is achieved by interrogating the computer system on which the software is in execution to ensure that only allowable libraries are used. In such an implementation, the efficiency of the resulting software application in execution is optionally improved at the cost of expanded storage requirements for software supporting different hardware and operating system configurations.

Problematically, software designed for execution on multiple systems is not the norm. Typically, software developers seek to provide software installation that allows for efficient single computer system installation of software. Typical installations of software applications are ill suited for installation on the removable peripheral memory storage device 19.

Figure 4:
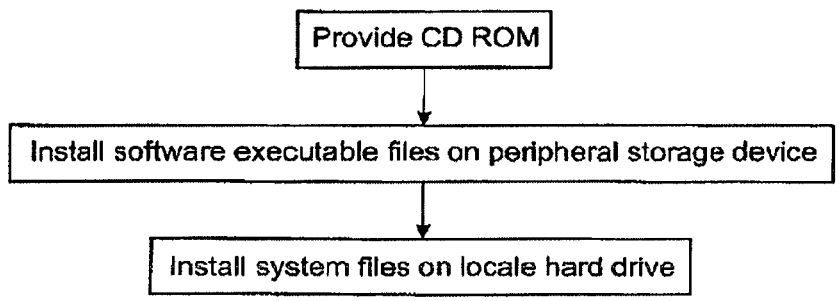
FIG. 4 is a simplified flow diagram of a method of installing a software application within a removable peripheral memory storage device for use only with a single host computer system according to the prior art.

Referring to FIG. 4, a simplified flow diagram of a typical software application installation within a removable peripheral memory storage device 19 and execution thereof is shown. A software application is installed using storage memory within the removable peripheral memory storage device 19. The application data is stored within the removable peripheral memory storage device 19 and system files for operation therewith are installed within appropriate system folders of the computer system. The software application, once installed, is executable within the computer system on which it was installed. Thus, the memory storage of the removable peripheral memory storage device 19 is useful for storing of the software application but its portability is lost because system related files and data are stored within the computer system's operating system directories and registry in the case of Windows® based operating systems of the internal hard drive 15. As these files and data are used in execution of the software application, the software application is for execution exclusively on the system on which it was installed.

Figure 5:
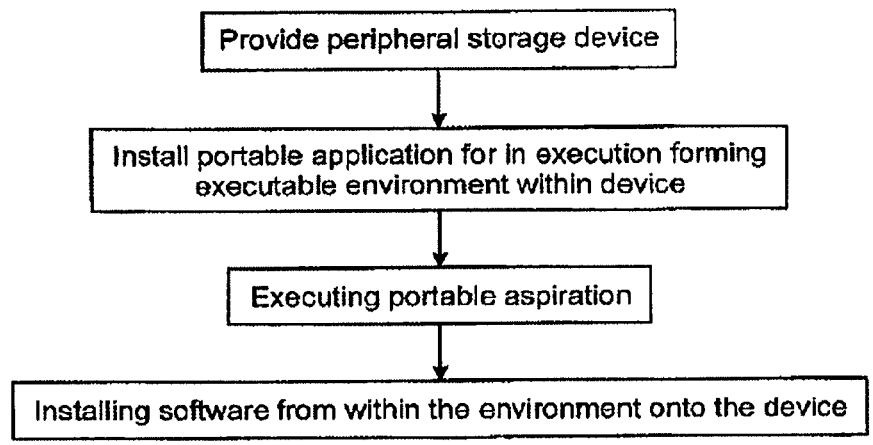
FIG. 5 is a simplified flow diagram of a method of installing a software application within a removable peripheral memory storage device during execution of a first executable environment, the software application for executing on any of a number of host computer systems each having the first executable environment in execution thereon.

Referring to FIG. 5, a simplified flow diagram of a method according to an embodiment of the invention is shown for installing software applications other than developed for portable installation thereof in a portable storage medium in the form of a removable peripheral memory storage device and for maintaining portability thereof once so installed.

Within the removable peripheral memory storage device 19 is installed a first software application for providing an environment for execution therein of software applications. The environment is designed to be executed from portable memory devices and, as such, is not configured for execution solely within a single system. Here, this is achieved when the environment, during execution, interrogates the host computer system to determine its capabilities—both software and hardware. The first software application is executed for forming the environment. Within the environment, a second software application is installed within the removable peripheral memory storage device 19. Thus, the installation process for the second software application interrogates the environment formed by the first software application and installs the second software application within that environment. Preferably, the second software application does not need modifications to install properly within the first software application environment. Further preferably, the first software application environment is designed for supporting a plurality of software applications for execution therein without modifications to the plurality of software applications from their form for execution absent the first software application environment. The software is configured for proper execution within the environment and the environment addresses any system specific issues that arise due to porting of the removable peripheral memory storage device 19. Thus, an application intended for a fixed single system installation becomes a portable application without any necessary modifications thereto. This is highly advantageous. Typically, this is achieved for second software applications that are absent installation requirements for additional core kernel services ex: drivers or Windows® services.

During execution of the second software application, the environment is first executed and the second software application is executed within the environment. Environment specific library calls result in execution of either the environment library call to perform the function or in indirect execution of one or more system library call depending on the available system libraries and hardware as determined during interrogation of the computer system. By generating environment libraries, environment data, and capabilities that mimic operating system libraries, data, and capabilities, installation is straightforward relying on the existing installation software application. As such, the environment optionally supports unmodified software and installation software to provide heretofore unavailable portability.

Figure 6:
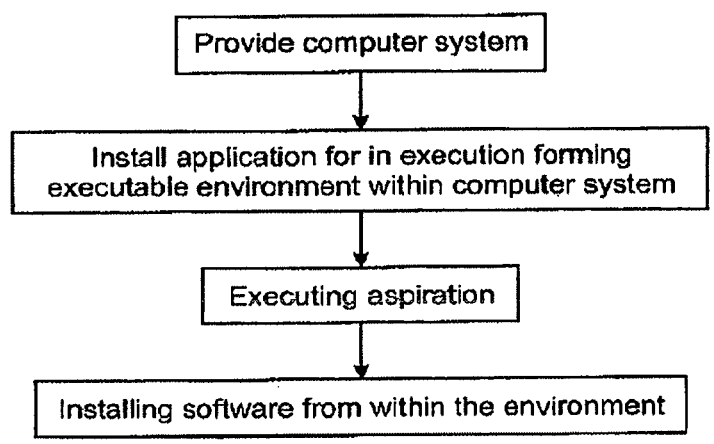
FIG. 6 is a simplified flow diagram of a method of installing a software application within a removable peripheral memory storage device during execution of a first executable environment, the software application for executing on any of a number of host computer systems each having the first executable environment installed thereon.

Referring to FIG. 6, a simplified flow diagram of a method according to an embodiment of the invention is shown for installing software applications other than developed for portable installation thereof in a portable storage medium in the form of a removable peripheral memory storage device and for maintaining portability thereof once so installed.

Within the computer system is installed a first software application for providing an environment for execution therein of software applications. The environment is designed to be executed solely within a single system. The first software application is executed for forming the environment. Within the environment, a second software application is installed within the removable peripheral memory storage device 19. Thus, the installation process for the second software application interrogates the environment formed by the first software application and installs the second software application within that environment. The software is configured for proper execution within the environment and the environment addresses any system specific issues that arise due to porting of the removable peripheral memory storage device 19. Thus, an application intended for a fixed single system installation becomes a portable application to any computer system having the environment—the first software application—installed therein without any necessary modifications thereto. Another advantage, in general, is an ease with which an environment is initiated rendering access to portable software applications convenient. This is highly advantageous.

During execution of the second software application, the environment is first executed and the second software application is executed within the environment. Environment specific library calls result in execution of either the environment library call to perform the function or in indirect execution of one or more system library call depending on the available system libraries and hardware as determined during installation of the environment. By generating environment libraries, environment data, and capabilities that mimic operating system libraries, data and capabilities, installation is straightforward relying on the existing installation software application. As such, the environment optionally supports unmodified software and installation software to provide heretofore unavailable portability.

Figure 7:
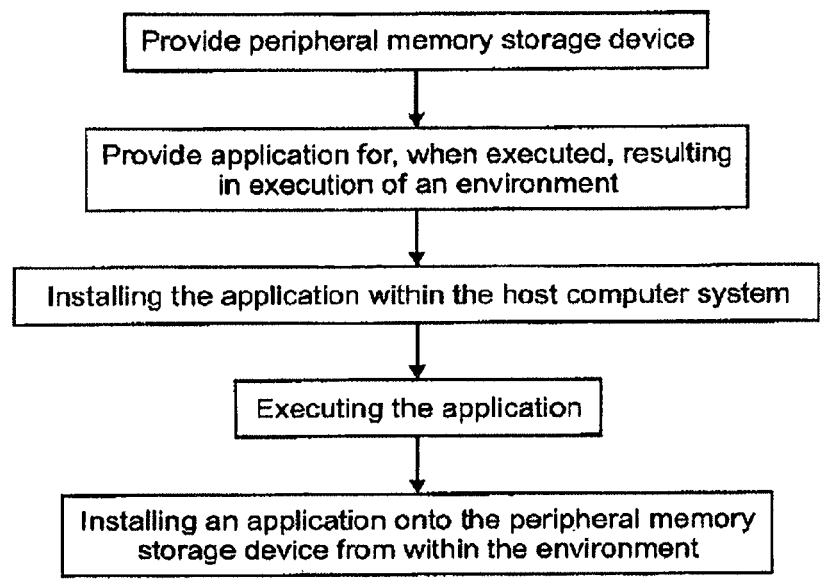
FIG. 7 is a simplified flow diagram of a method of installing a software application within a removable peripheral memory storage device during execution of a first executable environment, the software application for executing on any of a number of host computer systems, the peripheral memory storage device having the first executable environment stored therein for execution within each of a plurality of different host computer systems, the software application for execution on each of said plurality of host computer systems.

Referring to FIG. 7, a simplified flow diagram of a method according to an embodiment of the invention is shown for installing software applications other than developed for portable installation thereof in a portable storage medium in the form of a removable peripheral memory storage device and for maintaining portability thereof once so installed.

Within the removable peripheral memory storage device 19 is a first installation software application for installing first software for providing an environment for execution therein of software applications. The environment is designed to be executed from the computer system and to be installed from the portable memory device and, as such, is preferably a small and easily portable application. The first software application when installed is executed for forming the environment. Within the environment, a second software application is installed within the removable peripheral memory storage device 19. Thus, the installation process for the second software application interrogates the environment formed by the first software application and installs the second software application within that environment. The software is configured for proper execution within the environment and the environment addresses any system specific issues that arise due to porting of the removable peripheral memory storage device 19. Thus, an application intended for a fixed single system installation becomes a portable application without any necessary modifications thereto. This is highly advantageous.

Further advantageously, the removable peripheral memory storage device has all the necessary data for installing and executing the first software application and the second software application thereby rendering the second software application portable as described in the previous embodiment and the first software installation application portable to ensure compatibility, even with unknown computer systems not having the first software application installed thereon.

During execution of the second software application, the environment is first executed and the second software application is executed within the environment. Environment specific library calls result in execution of either the environment library call to perform the function or in indirect execution of one or more system library call depending on the available system libraries and hardware as determined during installation of the first software application. By generating environment libraries, environment data, and capabilities that mimic operating system libraries, data, and capabilities, installation is straightforward relying on the existing installation software application. As such, the environment optionally supports unmodified software and installation software to provide heretofore unavailable portability.

Figure 8:
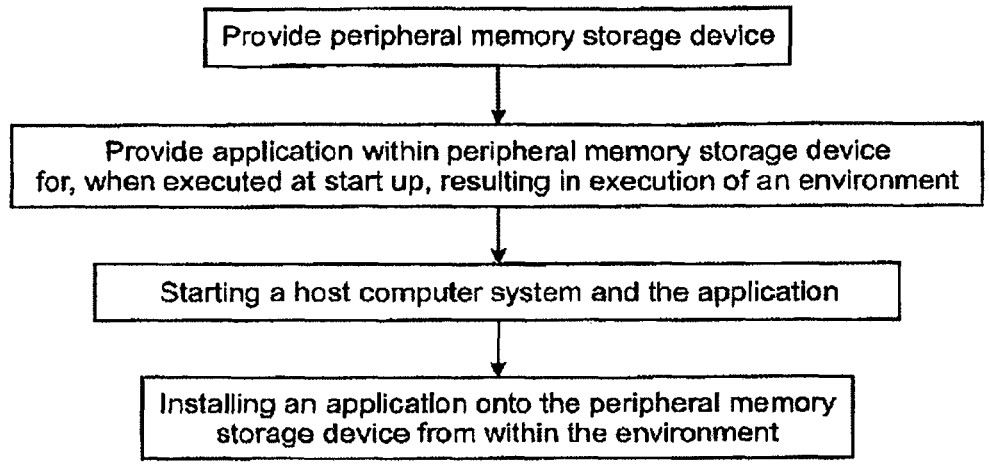
FIG. 8 is a simplified flow diagram of a method of installing a software application within a removable peripheral memory storage device during execution of a first executable environment, the software application for executing on any of a number of host computer systems, the peripheral memory storage device having the first executable environment stored therein for execution within each of a plurality of different host computer systems at start up thereof, the software application for execution on each of said plurality of host computer systems; and, FIG. 9 is a simplified flow diagram of a method of installing a software application within a removable peripheral memory storage device during execution of a first executable environment, the software application for executing on any of a number of host computer systems, the peripheral memory storage device having the first executable environment stored therein for execution within each of a plurality of different host computer systems, some of the host computer systems having a different operating system or a different processor or both from others of the different host computer systems.

Referring to FIG. 8, a simplified flow diagram of a method according to an embodiment of the invention is shown for installing software applications other than developed for portable installation thereof in a portable storage medium in the form of a removable peripheral memory storage device and for maintaining portability thereof once so installed.

Within the removable peripheral memory storage device 19 is installed a first software application for providing an environment for execution therein of software applications. The environment is designed to be executed from portable memory devices and, as such, is not configured for execution solely within a single system. Here, this is achieved at system start up when the removable peripheral memory storage device executes the first application for forming the environment and during execution, interrogates the host computer system to determine its capabilities—both software and hardware—and installs any desired libraries and drivers for the environment. Within the environment, a second software application is installed within the removable peripheral memory storage device 19. Thus, the installation process for the second software application interrogates the environment formed by the first software application and installs the second software application within that environment. The software is configured for proper execution within the environment and the environment addresses any system specific issues that arise due to porting of the removable peripheral memory storage device 19. Thus, an application intended for a fixed single system installation becomes a portable application without any necessary modifications thereto. Advantageously, by executing the environment at start up, it is possible to install libraries and drivers to render the environment and software applications executing therein more efficient.

During execution of the second software application, environment specific library calls are easily executed as the library calls are either installed or actively indirectly make system library or driver calls. By generating environment libraries and capabilities that mimic operating system libraries and capabilities, installation is straightforward relying on the existing installation software application. As such, the environment optionally supports unmodified software and installation software to provide heretofore unavailable portability.

Figure 9:
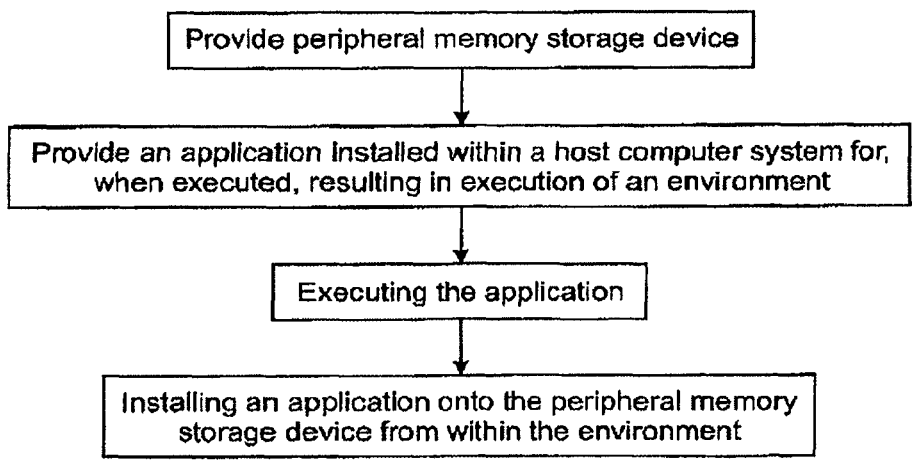

Referring to FIG. 9, a simplified flow diagram of a method according to an embodiment of the invention is shown for installing software applications other than developed for portable installation thereof in a portable storage medium in the form of a removable peripheral memory storage device and for maintaining portability thereof once so installed.

Within each computer system is installed a first software application for providing an environment for execution therein of software applications. The first software application is executed for forming the environment. Within the environment, a second software application is installed within the removable peripheral memory storage device 19. Thus, the installation process for the second software application interrogates the environment formed by the first software application and installs the second software application within that environment. The software is configured for proper execution within the environment and has different modules installed for supporting different operating systems and/or different hardware configurations and the environment addresses any system specific issues that arise due to porting of the removable peripheral memory storage device 19. Thus, an application intended for a fixed single system installation becomes a portable application without any necessary modifications thereto, the second software application portable between different operating systems and different computer hardware. This is highly advantageous.

During execution of the second software application, the environment is first executed and the second software application is executed within the environment. Because the environment knows about the computer system on which it is installed, it causes to be executed those portions of the second software application or that version of the second software application that relates to the hardware and operating system environment. Environment specific library calls result in execution of either the environment library call to perform the function or in indirect execution of one or more system library call depending on the available system libraries and hardware as determined during interrogation of the computer system. By generating environment libraries, environment data, and capabilities that mimic operating system libraries, data and capabilities, installation is straightforward relying on the existing installation software application. As such, the environment optionally supports unmodified software and installation software to provide heretofore unavailable portability.

Optionally the environment supports second software applications implemented for execution within different operating systems on a same processor. Further optionally the environment supports second software applications implemented for execution on different processors.

Of course, though the above embodiments are described with reference to removable peripheral memory storage devices, they are equally applicable to removable media devices such as portable hard disk drives, PCMCIA memory devices, USB memory devices, USB hard disk drives, compact flash memory devices, memory stick devices, and other portable flash RAM and hard disk based devices. Further, the above embodiments apply to providing portability for software that is other than developed to support portability With any of the above mentioned devices, the read/write random access memory provides similar performance capabilities to the internal hard drive 15 but with the additional advantage of portability. Further, by storing the application data on the removable peripheral memory storage device, the application and data are readily available simply through the act of porting the removable peripheral memory storage device.

Further, it is also possible to extend the teachings of the present invention to passive storage media such as CD-ROMS, DVD-ROMS, floppy disk drives, removable media, and so forth.

In an embodiment, an ActiveX forms part of a HTML page. The page and the Active X are downloaded. The ActiveX control then downloads executable data and launches it, for example by also injecting itself into it. As the program relies on access to registry and/or files, calls are forwarded to the world wide web server and information is then returned to the client. Advantageously, this solution does not require installation on a client system other than an ActiveX control execution which is often already present. Also, the application is executed on the client system and not on the server system and thus maintains a controllable its level of security.

Numerous other embodiments may be envisaged without departing from the spirit or scope of the invention.

What is claimed is:

1. A method comprising:
   providing an executable environment for application programs to be installed and executed with a peripheral storage device, the executable environment configured for execution within an operating system environment of a host system;
   providing an application for execution with the peripheral storage device, the application originally configured for fixed system installation and execution within the operating system environment of the host system, other than being portable from one such host system to another;
   installing the application within the executable environment, wherein files and data analogous to system related files and data of the application originally configured to be stored within the operating system environment of the host system are stored within the peripheral storage device; and
   executing the application within the executable environment, the executable environment intercepting a call made by the application for the host system to perform a function, and further:
      making an executable environment call to perform the function within the executable environment, if the intercepted call is supported therein; and
      making a system library call to the host system to perform the function, if the intercepted call is not supported by the executable environment and the intercepted call is supported by the host system.

2. The method of claim 1, further comprising coupling the peripheral storage device to the host system.

3. The method of claim 2, wherein coupling the peripheral storage device to the host system comprises connecting the peripheral storage device to a universal serial bus port on the host system.

4. The method of claim 2, wherein coupling the peripheral storage device to the host system is performed such that the executable environment is provided during start up.

5. The method of claim 1, wherein intercepting the call made by the application comprises intercepting an environment specific call, and further comprising executing the environment specific call to perform the function within the executable environment.

6. The method of claim 1, wherein intercepting the call made by the application comprises intercepting an application specific library call not supported by the executable environment.

7. The method of claim 6, further comprising translating the application specific system library call into a system library call compatible with the operating system.

8. The method of claim 7, wherein translating the application specific system library call comprises translating an application specific dynamic linked library call from the application into an operating system dynamic linked library call within the operating system.

9. The method of claim 8, further comprising performing the function without installation of the application specific dynamic linked library from the application within the operating system.

10. The method of claim 7, wherein translating the application specific system library call comprises translating an application specific dynamic linked library call from the application into instruction code compatible with the operating system.

11. The method of claim 1, further comprising executing the application within the executable environment without modification to the application, as originally configured for execution within the operating system environment of the host system.

12. The method of claim 11, wherein the application executes within the executable environment as if installed directly within the operating system environment of the host system.

13. The method of claim 12, further comprising varying system registry data provided to the application to mimic installation thereof on the host system.

14. The method of claim 1, further comprising authorizing a user of the peripheral storage device before execution of the application within the executable environment.

15. The method of claim 14, wherein authorizing the user comprises sensing biometric information.

16. The method of claim 1, further comprising storing one or both of the executable environment and the application within the peripheral storage device.

17. The method of claim 1, further comprising storing one or both of the executable environment and the application within a network accessible storage medium for access by a plurality of host systems.

18. The method of claim 1, further comprising providing the executable environment for execution within operating systems of differently configured host systems.

19. A peripheral storage device comprising:
memory operable to store data;
executable environment data stored within the memory, the executable environment data operable for installation within a host operating system to provide an executable environment therein; and
application software data stored within the memory, the application software data operable for installation within the executable environment to execute a software application therein, the application software data originally configured for fixed system installation and execution within the host operating system, other than being portable from one such host operating system to another, wherein system related files and data of the application originally configured to be stored within the host operating system are instead stored within the peripheral storage device;
wherein the executable environment, in execution of the software application, is operable to:
intercept environment specific calls made by the software application;
determine whether the environment specific calls are supported by the first executable environment and the host operating system;
make an executable environment call within the first executable environment to perform the function, if the environment specific call is supported by the first executable environment; and
make a system library call to the host operating system to perform the function, if the environment specific call is supported by the host operating system and not by the executable environment.

20. The peripheral storage device of claim 19, wherein the software application is operable to execute within the executable environment without modification to the software application data, as originally configured for the host operating system.

21. The peripheral storage device of claim 20, wherein the executable environment is operable to execute the software application within differently configured host operating systems.

22. The peripheral storage device of claim 19, wherein the memory comprises a magnetic storage medium for storing the executable environment data and the application software data.

23. The peripheral storage device of claim 19, wherein the memory comprises a flash medium for storing the executable environment data and the application software data.

24. The peripheral storage device of claim 19, further comprising a universal serial bus connector for coupling the device to a universal serial bus port on a host computer executing the host operating system.

25. A non-transitory, tangible computer readable storage medium having program code stored thereon, the program code executable to perform a method comprising:
installing an executable environment on a host system, the executable environment configured for execution within an operating system environment of the host system;
installing a software application within the executable environment, the software application originally configured for fixed system execution within the operating system environment of the host system, other than being portable from one such host system to another;
executing the software application within the executable environment, wherein system related files and data of the software application originally configured to be stored within the operating system environment of the host system are instead stored within a peripheral storage device coupled to the host system;
the executable environment intercepting an environment specific call made by the software application to perform a function within the operating system environment of the host system; and
making an executable environment call to perform the function within the executable environment, if the intercepted call is supported therein; and
making a system library call to the host system to perform the function, if the intercepted call is not supported by the executable environment and the intercepted call is supported by the host system.

26. The non-transitory, tangible computer readable storage medium of claim 25, the method further comprising making a system library call to the host system to perform the function, wherein the intercepted call is not supported by the executable environment.

27. The non-transitory, tangible computer readable storage medium of claim 26, the method further comprising translating the intercepted call into a system library call or instruction code compatible with the operating system environment of the host system.

28. The non-transitory, tangible computer readable storage medium of claim 25, the method further comprising installing the executable environment on a plurality of differently configured host systems, wherein the software application is operable to execute within the executable environment as if installed directly within the operating system environment of the differently configured host systems.

29. The non-transitory, tangible computer readable storage medium of claim 25, the method further comprising varying system registry data provided to the software application to mimic execution within the operating system environment of the host system.

* * * * *